United States Patent
Otsuka (10) Patent No.: US 7,869,467 B2
(45) Date of Patent: Jan. 11, 2011

(54) RECEIVING DEVICE INCLUDING PACKET OUTPUT CIRCUIT FOR OUTPUTTING CONTROL SIGNAL

(75) Inventor: Tatsushi Otsuka, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 106 days.

(21) Appl. No.: 12/126,393

(22) Filed: May 23, 2008

(65) Prior Publication Data

US 2008/0225896 A1    Sep. 18, 2008

Related U.S. Application Data

(63) Continuation of application No. PCT/JP2005/021590, filed on Nov. 24, 2005.

(51) Int. Cl.
*H04J 3/06* (2006.01)
(52) U.S. Cl. .................................. 370/509; 370/512
(58) Field of Classification Search .................. None
See application file for complete search history.

(56) References Cited

U.S. PATENT DOCUMENTS

| 7,069,574 | B1 * | 6/2006 | Adams et al. ................. 725/68 |
| 2002/0067744 | A1 | 6/2002 | Fujii et al. | |
| 2003/0053795 | A1 * | 3/2003 | Ando ........................... 386/95 |
| 2004/0042554 | A1 * | 3/2004 | Ishizuka et al. ........ 375/240.26 |
| 2005/0135368 | A1 * | 6/2005 | Nakamura .................. 370/392 |
| 2005/0190872 | A1 * | 9/2005 | Seong et al. ................. 375/354 |
| 2005/0259754 | A1 * | 11/2005 | Ho et al. ................. 375/240.28 |
| 2007/0121661 | A1 * | 5/2007 | Ohta et al. .................. 370/412 |

FOREIGN PATENT DOCUMENTS

| EP | 0 749 244 A2 | 12/1996 |
| JP | 11-215144 A | 8/1999 |
| JP | 2000-358006 A | 12/2000 |
| JP | 2002-204404 A | 7/2002 |
| JP | 2004-289544 A | 10/2004 |
| WO | WO 2004/010670 A1 | 1/2004 |

OTHER PUBLICATIONS

EP Search Report regarding EP Application No. 05809401.2-1247/ 1953948 dated Jul. 5, 2010.*
Nikolaos Laoutaris et al., "Intrastream Synchronization for Continuous Media Streams: A Survey of Playout Schedulers", IEEE Network, IEEE Service Center, New York, NY, US, vol. 16, No. 3, May 1, 2002. pp. 30-40.

* cited by examiner

*Primary Examiner*—Donald L Mills
*Assistant Examiner*—Christine Duong
(74) *Attorney, Agent, or Firm*—Arent Fox LLP (57) ABSTRACT

A clocking circuit of a receiving unit performs a clocking operation synchronously with a network clock. A packet output circuit of the receiving unit outputs a second packet included in a first packet and outputs a control signal indicating normality/abnormality of output timing of the second packet based on a result of comparing a time of the clocking circuit and a time of first time information included in the first packet. A clock adjusting circuit of a processing unit synchronizes, when the second packet includes second time information indicating a time based on a transmitting side reference clock and when the control signal indicates normality, a receiving side reference clock with the transmitting side reference clock based on a result of comparing a time based on the receiving side reference clock and a time of the second time information.

5 Claims, 10 Drawing Sheets

RECEIVING DEVICE INCLUDING PACKET OUTPUT CIRCUIT FOR OUTPUTTING CONTROL SIGNAL

CROSS REFERENCE TO RELATED APPLICATION

This application is a continuation application of International Application No. PCT/JP2005/021590, filed Nov. 24, 2005, designating the U.S., the entire contents of which are incorporated herein by reference.

BACKGROUND

1. Field

The present embodiment relates to a receiving device in a system transmitting video data and/or audio data, The video data may be MPEG-2TS (Moving Picture Experts Group phase 2 Transport Stream) and may be transmitted via a network such as IEEE1394.

2. Description of the Related Art

In Patent Document 1 (Japanese Unexamined Patent Application Publication No. 2000-358006), there is disclosed a technology to absorb easily and reliably fluctuation of delay times occurring on a network and transmit/receive data corresponding to plural programs without making the device more complicated and larger. In Patent Document 2 (Japanese Unexamined Patent Application Publication No. H11-215144), there is disclosed a technology to reproduce MPEG-2TS properly without using a large memory even when time information is outdated.

SUMMARY

It is an aspect of the embodiments discussed herein to provide a receiving device, including: a receiving unit receiving a first packet from a transmitting device via a network and outputting a second packet included in the first packet; and a processing unit receiving the second packet and implementing processing based on a receiving side reference clock on the second packet, wherein the receiving unit including a clocking circuit performing a clocking operation synchronously with a network clock, and a packet output circuit outputting the second packet and outputting a control signal indicating normality/abnormality of output timing of the second packet based on a result of comparing a time of the clocking circuit and a time of first time information included in the first packet; and the processing unit comprises a clock adjusting circuit synchronizing, when the second packet includes second time information indicating a time based on a transmitting side reference clock and when the control signal indicates normality, the receiving side reference clock with the transmitting side reference clock based on a result of comparing a time based on the receiving side reference clock and a time of the second time information.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

In an MPEG-2TS transmission system, it is required for an MPEG decoding unit on the receiving side to compare the value of an STC (System Time Clock) (count value of receiving side reference clock) and the value of a PCR (Program Clock Reference) (count value of transmitting side reference clock) incorporated in an MPEG-2TS packet, and make a receiving side reference clock accord with a transmitting side reference clock based on the comparison result. Note that the PCR is incorporated in the MPEG-2TS packet at a predetermined time interval (0.1 second or shorter) in an MPEG encoding unit on the transmitting side.

Specifically, when the PCR is incorporated in the MPEG-2TS packet, the MPEG decoding unit compares the value of the STC and the value of the PCR. When the value of the STC is larger than the value of the PCR, the MPEG decoding unit determines that the cycle of the receiving side reference clock is shorter than the cycle of the transmitting side reference clock, and lengthens the cycle of the receiving side reference clock. Conversely, when the value of the STC is smaller than the value of the PCR, the MPEG decoding unit determines that the cycle of the receiving side reference clock is longer than the cycle of the transmitting side reference clock, and shortens the cycle of the receiving side reference clock. Further, when the value of the STC matches with the value of the PCR, the MPEG decoding unit determines that the receiving side reference clock is synchronous with the transmitting side reference clock, and does not adjust the receiving side reference clock. By making the receiving side reference clock accord with the transmitting side reference clock by such an operation, the MPEG decoding unit can implement decoding processing of MPEG-2TS (reproduction processing of video data and audio data) smoothly.

Although the MPEG-2TS is assumed to be applied to a data transmission system by an ATM (Asynchronous Transfer Mode) network, the target of application is not limited specifically. Accordingly, the MPEG-2TS is also applied to systems such as CS/BS digital broadcasting, terrestrial digital broadcasting, and the like, or data transmission systems by IEEE1394 or the like. To enable adjusting of the receiving side reference clock by the PCR according to provisions of the MPEG-2TS on the receiving side, it is necessary that a delay time of each MPEG-2TS packet to be transmitted from the MPEG encoding unit on the transmitting side to the MPEG decoding unit on the receiving side is constant. This means that time intervals of MPEG-2TS packets must be maintained when each MPEG-2TS packet is input from the MPEG encoding unit to a network interface unit (packet transmitting unit) on the transmitting side, and when each MPEG-2TS packet is output from a network interface unit (packet receiving unit) to the MPEG decoding unit on the receiving side. This is because if the time intervals of MPEG-2TS packets are not maintained, it becomes impossible in the MPEG decoding unit to determine whether the difference between the value of the STC and the value of the PCR is due to advance/delay of the receiving side reference clock or due to dispersion in time intervals of the MPEG-2TS packets.

In addition, it is impossible or wasteful in terms of costs, with respect to system design, that the transmission delay time from the MPEG encoding unit on the transmitting side to the MPEG decoding unit on the receiving side to be completely the same for all MPEG-2TS packets. Accordingly, for the MPEG decoding unit, it is required to set a tolerable range for the difference between the value of the STC and the value of the PCR, and implement adjustment of the receiving side reference clock considering jitters. In any case, in the MPEG-2TS transmission system, a mechanism to maintain the time intervals of MPEG-2TS packets to be within a tolerable range is necessary.

For example, in an MPEG-2TS transmission system by IEEE1394, the packet transmitting unit on the transmitting side and the packet receiving unit on the receiving side each has a cycle timer that performs a counting operation synchronously with a network clock. The network clock is a clock (frequency: 24.576 MHz) supplied commonly to devices coupled to the IEEE1394. Upon reception of an MPEG-2TS packet output from the MPEG encoding unit, the packet transmitting unit adds a header including a timestamp to the MPEG-2TS packet to generate an IEEE1394 packet, and outputs the IEEE1394 packet to the network (IEEE1394). The time stamp indicates an added value of the value of a cycle timer when receiving the MPEG-2TS packet and the offset value corresponding to a maximum delay time generated by packet transmission via the network. The packet receiving unit receives the IEEE1394 packet from the packet transmitting unit via the network, and when the value of the cycle timer matches with the value of the time stamp included in the header of the IEEE1394 packet, the packet receiving unit outputs the MPEG-2TS packet included in the IEEE1394 packet to the MPEG decoding unit. Accordingly, time intervals of input timing of MPEG-2TS packets in the packet transmitting unit and time intervals of output timing of MPEG-2TS packets in the packet receiving unit can be made the same.

As described above, in the MPEG-2TS transmission system by the IEEE1394, the packet receiving unit outputs MPEG-2TS packets according to time stamps so as to maintain time intervals of the MPEG-2TS packets. This however requires an implicit assumption such that the data transfer speed between the MPEG encoding unit and the packet transmitting unit on the transmitting side and the data transfer speed between the packet receiving unit and the MPEG decoding unit on the receiving side are equal.

In general, in the packet transmitting unit and the packet receiving unit, operations with respect to the network are defined, but other operations are not particularly defined. For example, in the above-described MPEG-2TS transmission system by the IEEE1394, the data transfer speed between the MPEG encoding unit and the packet transmitting unit on the transmitting side and the data transfer speed between the packet receiving unit and the MPEG decoding unit on the receiving side are not defined at all.

For the IEEE1394, the frequency of the reference clock (network clock) for the cycle timer on the packet transmitting unit and the packet receiving unit is 24.576 MHz. Therefore, in common sense, it is expected that the reference clock for data transfer between the MPEG encoding unit and the packet transmitting unit and the reference clock for data transfer between the packet receiving unit and the MPEG decoding unit are 24.576 MHz clocks, but this is not always guaranteed. For example, data transfer of transferring one-byte data at every cycle of a 24.576 MHz clock has a data transfer speed of 196.608 Mbps, which is sufficient for general data transfer (data transfer speed: a few tens of Mbps) by the MPEG-2TS. Therefore, normally, as the data transfer between the MPEG encoding unit and the packet transmitting unit and the data transfer between the packet receiving unit and the MPEG decoding unit, it is conceivable that the data transfer of transferring one-byte data at every cycle of the 24.576 MHz clock to be sufficient.

However, when for example the MPEG encoding unit is a personal computer and outputs MPEG-2TS that is processed off-line by authoring software or the like, since the overhead of task switching of the OS (operation system) is large while the personal computer itself has a CPU operating fast at a few GHz and a few hundred Mbytes of memory, it is possible that there is adopted a system structure configured to buffer transmitting data in advance and output the buffered data when being switched to a transmission task. In such cases, for a period which is long in some measure, the data transfer rate between the MPEG encoding unit and the packet transmitting unit falls within a predetermined bit rate, but for a temporary period, a large amount of data is transferred from the MPEG encoding unit to the packet transmitting unit.

For example, it is considered that on the receiving side the packet receiving unit outputs a certain MPEG-2TS packet P(n) to the MPEG decoding unit according to a time stamp T(n), and outputs a next MPEG-2TS packet P(n+1) to the MPEG decoding unit according to a time stamp T(n+1). It is assumed that one-byte data are transferred at every cycle of the 24.576 MHz clock in data transfer between the packet receiving unit and the MPEG decoding unit.

Since the MPEG-2TS packet has a fixed length of 188 bytes, the value of the cycle timer in the packet receiving unit at the time of completing the data transfer of the MPEG-2TS packet P(n) is in advance by 188 from the start time (value of the time stamp T(n)) of the data transfer of the MPEG-2TS packet P(n). Accordingly, when the following expression (1) is satisfied, a situation such that the value of the cycle timer exceeds the value of the time stamp T(n+1) is impossible to occur at the time of starting the data transfer of the MPEG-2TS packet P(n+1). Therefore, the MPEG-2TS packet P(n+1) can be output at normal timing. Specifically, the time interval of the MPEG-2TS packet P(n) and the MPEG-2TS packet P(n+1) can be maintained.

$$T(n+1)-T(n) \geq 188 \qquad (1)$$

On the other hand, when the following expression (2) is satisfied, at the time of starting the data transfer of the MPEG-2TS packet P(n+1), the situation such that the value of the cycle timer exceeds the value of the time stamp T(n+1) occurs. Therefore, the MPEG-2TS packet P(n+1) cannot be output at normal timing. Specifically, the time interval of the MPEG-2TS packet P(n) and the MPEG-2TS packet P(n+1) cannot be maintained. Accordingly, the MPEG-2TS packet P(n+1) is considered as a Late packet (packet that cannot be output at normal timing) and hence has to be discarded. If, tentatively, the MPEG-2TS packet P(n+1) is output forcibly even when the timing is abnormal, an unnecessary error occurs in the receiving side reference clock when the PCR is incorporated in the MPEG-2TS packet P(n+1).

$$T(n+1)-T(n)<188 \qquad (2)$$

Figure 1:
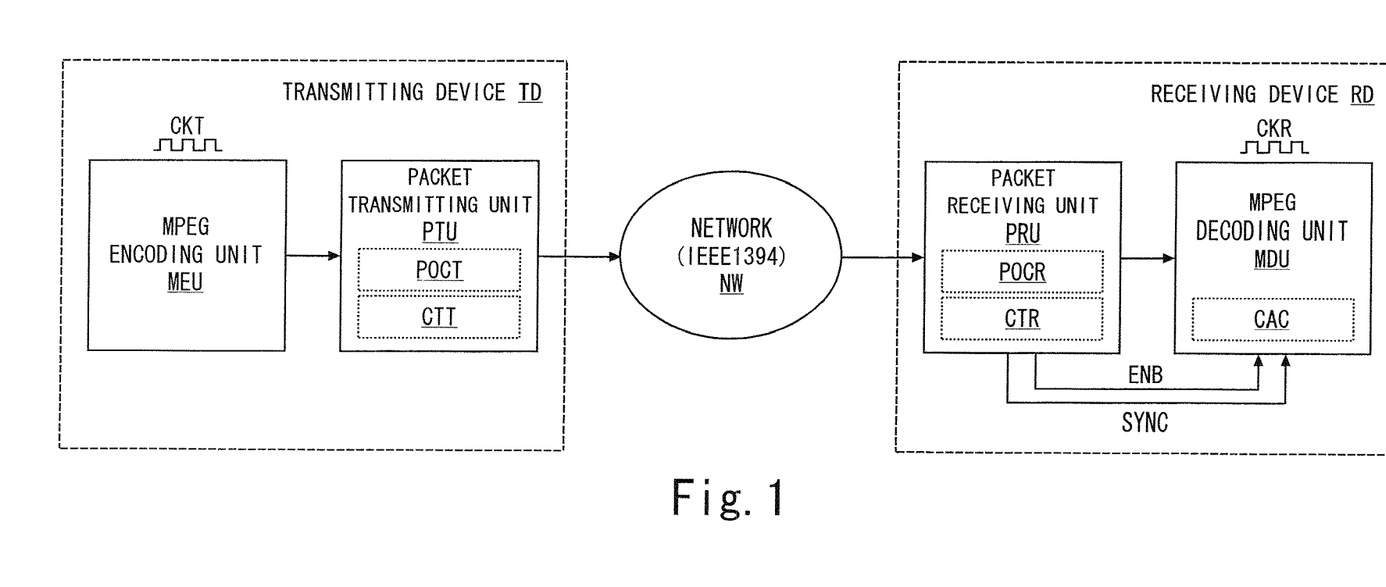
FIG. 1 is a block diagram illustrating an example of an MPEG-2TS transmission system.

Hereinafter, an embodiment will be explained using the drawings. FIG. 1 to FIG. 5 illustrate one embodiment. FIG. 1 illustrates an example of an MPEG-2TS transmission system. A transmitting device TD has an MPEG encoding unit MEU and a packet transmitting unit PTU. The MPEG encoding unit MEU implements encoding processing of video data and audio data synchronously with a reference clock CKT according to the MPEG-2 standard. The MPEG encoding unit MEU packetizes the MPEG-2TS obtained by the encoding processing to generate an MPEG-2TS packet, and outputs the MPEG-2TS packet to the packet transmitting unit PTU at desired timing. For example, through data transfer between the MPEG encoding unit MEU and the packet transmitting unit PTU, one-byte data are transferred at every cycle of a 24.576 MHz clock. Further, the MPEG encoding unit MEU incorporates a PCR (count value of the reference clock CKT) in the MPEG-2TS packet at a constant time interval.

The packet transmitting unit PTU has a cycle timer CTT and a packet output circuit POCT. The cycle timer CTT performs a counting operation synchronously with a network clock (frequency: 24.576 MHz) supplied in common to each device coupled to a network NW (IEEE1394). Upon reception of the MPEG-2TS packet output from the MPEG encoding unit MEU, the packet output circuit POCT adds a header including a time stamp to the MPEG-2TS packet to generate an IEEE1394 packet, and outputs the IEEE1394 packet to the network NW at desired timing. The time stamp indicates a value obtained by adding an offset value corresponding to a maximum delay time caused by packet transmission via the network NW to the value of the cycle timer CTT at the time of receiving the MPEG-2TS packet. Note that the maximum delay time generated by packet transmission via the network NW includes, for example, in addition to a delay time occurring on the network NW, a buffering time from generation of an IEEE1394 packet by the packet output circuit POCT to output of this packet to the network NW.

A receiving device RD has the packet receiving unit PRU and the MPEG decoding unit MDU. The packet receiving unit PRU has a cycle timer CTR and a packet output circuit POCR. Similarly to the cycle timer CTT, the cycle timer CTR performs a counting operation synchronously with the network clock. Upon reception of an IEEE1394 packet from the transmitting device TD via the network NW, the packet output circuit POCR stores the IEEE1394 packet in a buffer memory (not shown) or the like. When turned to a state capable of implementing packet output processing for the IEEE1394 packet, the packet output circuit POCR reads the IEEE1394 packet to be the target of the packet output processing from the buffer memory. Then the packet output circuit POCR compares the value of the cycle timer CTR and the value of the time stamp included in the header of the IEEE1394 packet read from the buffer memory, outputs an MPEG-2T packet included in the IEEE1394 packet based on the comparison result, and outputs a control signal ENB indicating an output period of the MPEG-2TS packet and a control signal SYNC indicating the head position of the MPEG-TS packet respectively.

Specifically, when the value of the cycle timer CTR is smaller than the value of the time stamp, the packet output circuit POCR waits until both the values match due to change of the value of cycle timer CTR, and thereafter outputs the MPEG-2TS packet. Further, along with the output of the MPEG-2TS packet, the packet output circuit POCR activates the control signal ENB to "1" in an output period of all the 188 bytes of the MPEG-2TS packet, and activates the control signal SYNC to "1" in an output period of the first one byte of the MPEG-2TS packet. When the value of the cycle timer CTR matches with the value of the time stamp, the packet output circuit POCR outputs the MPEG-2TS packet immediately. Further, along with the output of the MPEG-2TS packet, the packet output circuit POCR activates the control signal ENB to "1" in an output period of all the 188 bytes of the MPEG-2TS packet, and activates the control signal SYNC to "1" in an output period of the first one byte of the MPEG-2TS packet. When the value of the cycle timer CTR is larger than the value of the time stamp, the packet output circuit POCR outputs the MPEG-2TS packet immediately. Further, along with the output of the MPEG-2TS packet, the packet output circuit POCR activates the control signal ENB to "1" in an output period of all the 188 bytes of the MPEG-2TS packet.

In this manner, when the value of the cycle timer CTR is equal to or smaller than the value of the time stamp, and the MPEG-2TS packet can be output at normal timing, the packet output circuit POCR activates the control signal SYNC to "1" in the output period of the first one byte of the MPEG-2TS packet. On the other hand, when the value of the cycle timer CTR is larger than the value of the time stamp, and the MPEG-2TS packet cannot be output at normal timing, the packet output circuit POCR does not activate the control signal SYNC to "1" in the output period of the first one byte of the MPEG-2TS packet. Therefore, the control signal SYNC functions as a signal to identify normality/abnormality of an output timing of the MPEG-2TS packet. Note that details of the packet output processing of the packet receiving unit PRU (packet output circuit POCR) will be explained in FIG. 2.

Further, through data transfer between the packet receiving unit PRU and the MPEG decoding unit MDU for example, one-byte data are transferred at every cycle of a 12.288 MHz clock. Specifically, the data transfer speed between the packet receiving unit PRU and the MPEG decoding unit MDU (packet output speed in the packet receiving unit PRU) is ½ of the data transfer speed between the MPEG encoding unit MEU and the packet transmitting unit PTU (packet input speed in the packet transmitting unit PTU).

In response to activation (change from "0" to "1") of the control signal ENB output from the packet receiving unit PRU, the MPEG decoding unit MDU starts a taking-in operation of the MPEG-2TS packet output from the packet receiving unit PRU. In response to inactivation (change from "1" to "0") of the control signal ENB, the MPEG decoding unit MDU finishes the taking-in operation of the MPEG-2TS packet. Further, in response to activation of the control signal ENB, the MPEG decoding unit MDU stores the logic level of the control signal SYNC output from the packet receiving unit PRU by a flag circuit (not shown) or the like.

The MPEG decoding unit MDU has a clock adjusting circuit CAC. When the MPEG-2TS packet taken in during the activation period of the control signal ENB includes a PCR and the logic level of the control signal SYNC stored in response to activation of the control signal ENB indicates "1", the clock adjusting circuit CAC compares the value of an STC (count value of the reference clock CKR) and the value of a PCR and adjusts the reference clock CKR based on the comparison result, so as to synchronize the reference clock CKR with the reference clock CKT. Note that details of the clock adjusting processing of the MPEG decoding unit MDU (clock adjusting circuit CAC) will be explained with FIG. 3. Further, after implementing the clock adjusting processing, the MPEG decoding unit MDU depacketizes the MPEG-2TS packet to generate the MPEG-2TS, and implements decoding processing of the MPEG-2TS synchronously with the reference clock CKR according to the MPEG-2 standard.

Figure 2:
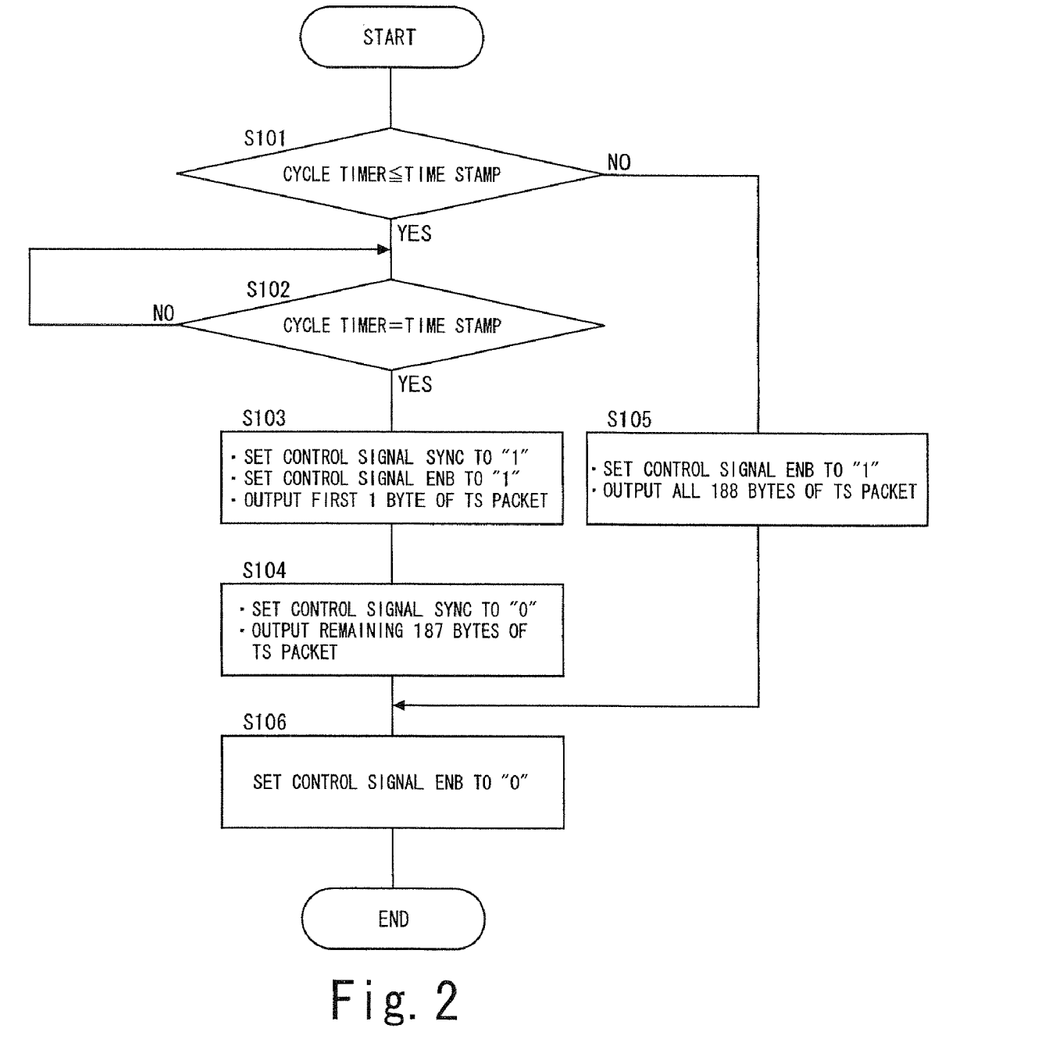
FIG. 2 is a flowchart illustrating packet output processing of a packet receiving unit in one embodiment.

FIG. 2 illustrates packet output processing of the packet receiving unit in the one embodiment. The packet receiving unit PRU outputs an MPEG-2TS packet included in an IEEE1394 packet by the packet output circuit POCR appropriately implementing operations S101 to S106 explained below.

(Operation S101) The packet output circuit POCR determines whether or not the value of the cycle timer CTR is equal to or smaller than the value of the time stamp included in the IEEE1394 packet. When the value of the cycle timer CTR is equal to or smaller than the value of the time stamp, the packet output processing proceeds to operation S102. When the value of the cycle timer CTR is larger than the value of the time stamp, the packet output processing proceeds to operation S105.

(Operation S102) The packet output circuit POCR determines whether the value of the cycle timer CTR matches with the value of the time stamp or not. When the value of the cycle timer CTR matches with the value of the time stamp, the packet output processing proceeds to operation S103. When the value of the cycle timer CTR does not match with the value of the time stamp (specifically, the value of the cycle timer CTR is smaller than the value of the time stamp), operation S102 is implemented repeatedly until the value of the cycle timer CTR matches with the value of the time stamp.

(Operation S103) The packet output circuit POCR determines that the MPEG-2TS packet can be output at normal timing, and then sets the control signal SYNC and the control signal ENB to "1" respectively and outputs the first one byte of the MPEG-2TS packet included in the IEEE1394 packet. Thereafter, the packet output processing proceeds to operation S104.

(Operation S104) The packet output circuit POCR sets the control signal SYNC to "0", and outputs the remaining 187 bytes of the MPEG-2TS packet. Thereafter, the packet output processing proceeds to operation S106.

(Operation S105) The packet output circuit POCR determines that the MPEG-2TS packet cannot be output at normal timing, and then sets the control signal ENB to "1" and outputs all the 188 bytes of the MPEG-2TS packet included in the IEEE1394 packet. Thereafter, the packet output processing proceeds to operation S106.

(Operation S106) Upon completion of the output of the MPEG-2TS packet, the packet output circuit POCR sets the control signal ENB to "0". Thus the packet output processing is completed.

Figure 3:
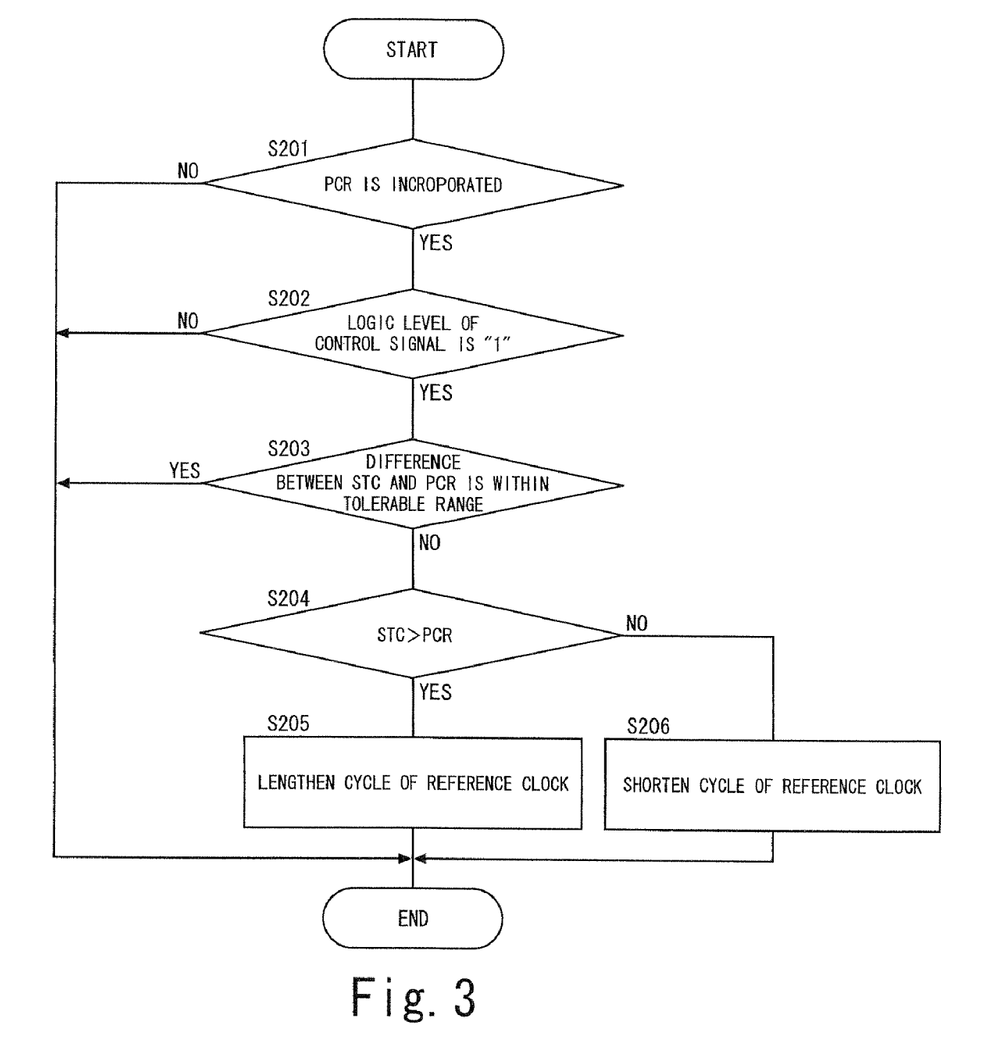
FIG. 3 is a flowchart illustrating a clock adjusting processing of an MPEG decoding unit in the one embodiment.

FIG. 3 illustrates clock adjusting processing of the MPEG decoding unit in the one embodiment. The MPEG decoding unit MDU synchronizes the reference clock CKR with the reference clock CKT by the clock adjusting circuit CAC appropriately implementing operations S201 to S206 explained below.

(Operation S201) The clock adjusting circuit CAC determines whether or not a PCR is incorporated in the MPEG-2TS packet taken in during an activation period of the control signal ENB. When the PCR is incorporated in the MPEG-2TS packet, the clock adjusting processing proceeds to operation S202. When the PCR is not incorporated in the MPEG-2TS packet, the clock adjusting processing is completed without implementing adjusting of the reference clock CKR.

(Operation S202) The clock adjusting circuit CAC determines whether the logic level of the control signal SYNC stored in response to activation of the control signal ENB is "1" or not. When the logic level of the control signal SYNC is "1" (that is, when the MPEG-2TS packet is a packet output at normal timing), the clock adjusting processing proceeds to operation S203. When the logic level of the control signal SYNC is "0", (that is, when the MPEG-2TS packet is not a packet output at normal timing), the clock adjusting processing is completed without implementing adjusting of the reference clock CKR.

(Operation S203) The clock adjusting circuit CAC determines whether or not the difference between the value of an STC and the value of the PCR is within a tolerable range that is set in advance. When the difference between the value of the STC and the value of the PCR is within the tolerable range, the clock adjusting processing is completed without implementing adjusting of the reference clock CKR. When the difference between the value of the STC and the value of the PCR is beyond the tolerable range, the clock adjusting processing proceeds to operation S204.

(Operation S204) The clock adjusting circuit CAC determined whether the value of the STC is larger than the value of the PCR or not. When the value of the STC is larger than the value of the PCR, the clock adjusting processing proceeds to operation S205. When the value of the STC is smaller than the value of the PCR, the clock adjusting processing proceeds to operation S206.

(Operation S205) The clock adjusting circuit CAC determines that the cycle of the reference clock CKR is shorter than the cycle of the reference clock CKT, and lengthens the cycle of the reference clock CKR. Thus, the clock adjusting processing is completed.

(Operation S206) The clock adjusting circuit CAC determines that the cycle of the reference clock CKR is longer than the cycle of the reference clock CKT, and shortens the cycle of the reference clock CKR. Thus, the clock adjusting processing is completed.

Figure 4:
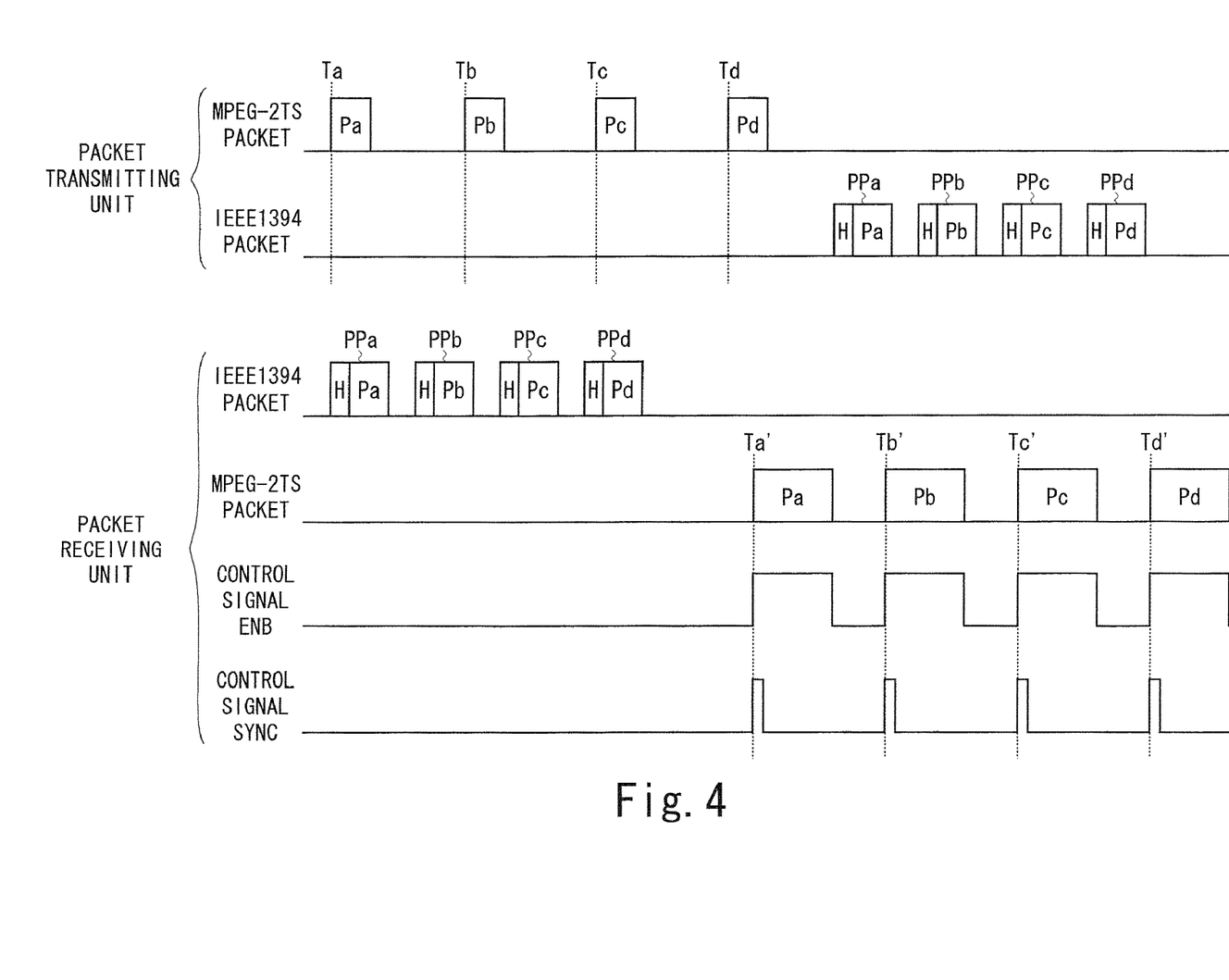
FIG. 4 is an explanatory view illustrating an operation example in the one embodiment.

FIG. 4 illustrates an operation example in the one embodiment. At time Ta, upon reception of an MPEG-2TS packet Pa output from the MPEG encoding unit MEU, the packet transmitting unit PTU (packet output circuit POCT) of the transmitting device TD adds a header H including a time stamp to the MPEG-2TS packet Pa to generate an IEEE1394 packet PPa. The time stamp included in the header H of the IEEE1394 packet PPa indicates a value (value corresponding to time Ta'=Ta+To) obtained by adding the offset value corresponding to a maximum delay time To generated by packet transferring via the network NW to the value of the cycle timer CTT at the time (time Ta) of receiving the MPEG-2TS packet Pa.

At time Tb, upon reception of an MPEG-2TS packet Pb, the packet transmitting unit PTU adds a header H including a time stamp to the MPEG-2TS packet Pb to generate an IEEE1394 packet PPb. The time stamp included in the header H of the IEEE1394 packet PPb indicates a value (value corresponding to time Tb'=Tb+To) obtained by adding the offset value corresponding to the maximum delay time To to the value of the cycle timer CTT at the time (time Tb) of receiving the MPEG-2TS packet Pb.

At time Tc, upon reception of an MPEG-2TS packet Pc, the packet transmitting unit PTU adds a header H including a time stamp to the MPEG-2TS packet Pc to generate an IEEE1394 packet PPc. The time stamp included in the header H of the IEEE1394 packet PPc indicates a value (value corresponding to time Tc'=Tc+To) obtained by adding the offset value corresponding to the maximum delay time To to the value of the cycle timer CTT at the time (time Tc) of receiving the MPEG-2TS packet Pc.

At time Td, upon reception of an MPEG-2TS packet Pd, the packet transmitting unit PTU adds a header H including a time stamp to the MPEG-2TS packet Pd to generate an IEEE1394 packet PPd. The time stamp included in the header H of the IEEE1394 packet PPd indicates a value (value corresponding to time Td'=Td+To) obtained by adding the offset value corresponding to the maximum delay time To to the value of the cycle timer CTT at the time (time Td) of receiving the MPEG-2TS packet Pd. Thereafter, the packet transmitting unit PTU outputs the IEEE1394 packets PPa, PPb, PPc, PPd sequentially to the network NW at desired timing.

The packet receiving unit PRU (packet output circuit POCR) of the receiving device RD receives the IEEE1394 packets PPa, PPb, PPc, PPd sequentially from the transmitting device TD via the network NW, and stores the IEEE1394 packets PPa, PPb, PPc, PPd sequentially in the buffer memory. When turned to a state capable of implementing packet output processing for the IEEE1394 packet PPa, the packet receiving unit PRU reads the IEEE1394 packet PPa from the buffer memory and compares the value of the cycle timer CTR and the value (value corresponding to time Ta') of the time stamp included in the header H of the IEEE1394 packet PPa. The value of the cycle timer CTR at this time point is smaller than the value of the time stamp, and hence the packet receiving unit PRU waits until the value of the cycle timer CTR matches with the value of the time stamp.

At time Ta', upon matching of the value of the cycle timer CTR with the value of the time stamp, the packet receiving unit PRU outputs the MPEG-2TS packet Pa included in the IEEE1394 packet PPa. Further, along with the output of the MPEG-2TS packet Pa, the packet receiving unit PRU activates the control signal ENB to "1" in an output period of all the 188 bytes of the MPEG-2TS packet Pa, and activates the control signal SYNC to "1" in an output period of the first one byte of the MPEG-2TS packet Pa. Thus, the packet output processing for the IEEE1394 packet PPa is completed.

The packet receiving unit PRU turns to a state capable of implementing packet output processing for the IEEE1394 packet PPb along with the completion of the packet output processing for the IEEE1394 packet PPa. Accordingly, the packet receiving unit PRU reads the IEEE1394 packet PPb from the buffer memory and compares the value of the cycle timer CTR and the value (value corresponding to time Tb') of the time stamp included in the header H of the IEEE1394 packet PPb. The value of the cycle timer CTR at this time point is smaller than the value of the time stamp, and hence the packet receiving unit PRU waits until the value of the cycle timer CTR matches with the value of the time stamp.

At time Tb', upon matching of the value of the cycle timer CTR with the value of the time stamp, the packet receiving unit PRU outputs the MPEG-2TS packet Pb included in the IEEE1394 packet PPb. Further, along with the output of the MPEG-2TS packet Pb, the packet receiving unit PRU activates the control signal ENB to "1" in an output period of all the 188 bytes of the MPEG-2TS packet Pb, and activates the control signal SYNC to "1" in an output period of the first one byte of the MPEG-2TS packet Pb. Thus, the packet output processing for the IEEE1394 packet PPb is completed.

The packet receiving unit PRU turns to a state capable of implementing packet output processing for the IEEE1394 packet PPc along with the completion of the packet output processing for the IEEE1394 packet PPb. Accordingly, the packet receiving unit PRU reads the IEEE1394 packet PPc from the buffer memory and compares the value of the cycle timer CTR and the value (value corresponding to time Tc') of the time stamp included in the header H of the IEEE1394 packet PPc. The value of the cycle timer CTR at this time point is smaller than the value of the time stamp, and hence the packet receiving unit PRU waits until the value of the cycle timer CTR matches with the value of the time stamp.

At time Tc', upon matching of the value of the cycle timer CTR with the value of the time stamp, the packet receiving unit PRU outputs the MPEG-2TS packet Pc included in the IEEE1394 packet PPc. Further, along with the output of the MPEG-2TS packet Pc, the packet receiving unit PRU activates the control signal ENB to "1" in an output period of all the 188 bytes of the MPEG-2TS packet Pc, and activates the control signal SYNC to "1" in an output period of the first one byte of the MPEG-2TS packet Pc. Thus, the packet output processing for the IEEE1394 packet PPc is completed.

The packet receiving unit PRU turns to a state capable of implementing packet output processing for the IEEE1394 packet PPd along with the completion of the packet output processing for the IEEE1394 packet PPc. Accordingly, the packet receiving unit PRU reads the IEEE1394 packet PPd from the buffer memory and compares the value of the cycle timer CTR and the value (value corresponding to time Td') of the time stamp included in the header H of the IEEE1394 packet PPd. The value of the cycle timer CTR at this time point is smaller than the value of the time stamp, and hence the packet receiving unit PRU waits until the value of the cycle timer CTR matches with the value of the time stamp.

At time Td', upon matching of the value of the cycle timer CTR with the value of the time stamp, the packet receiving unit PRU outputs the MPEG-2TS packet Pd included in the IEEE1394 packet PPd. Further, along with the output of the MPEG-2TS packet Pd, the packet receiving unit PRU activates the control signal ENB to "1" in an output period of all the 188 bytes of the MPEG-2TS packet Pd, and activates the control signal SYNC to "1" in an output period of the first one byte of the MPEG-2TS packet Pd. Thus, the packet output processing for the IEEE1394 packet PPd is completed.

Figure 5:
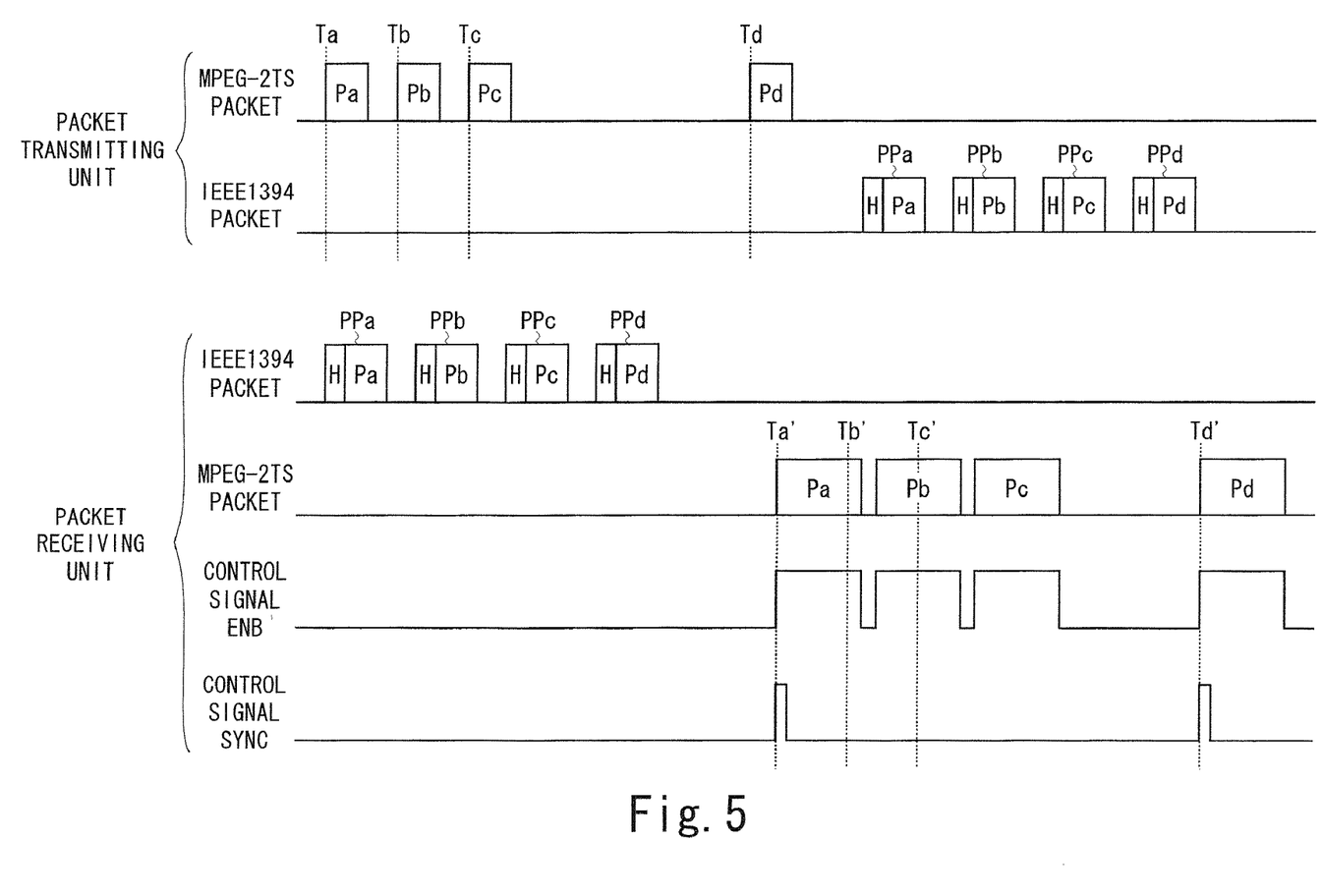
FIG. 5 is an explanatory view illustrating another operation example in the one embodiment.

FIG. 5 illustrates another operation example in the one embodiment. The packet transmitting unit PTU (packet output circuit POCT) of the transmitting device TD generates, similarly to the operation example explained with FIG. 4, IEEE1394 packets PPa, PPb, PPc, PPd sequentially. The packet transmitting unit PTU then outputs the IEEE1394 packets PPa, PPb, PPc, PPd at desired timing to the network NW sequentially. Note that as compared to the operation example explained with FIG. 4, the time interval between the times Ta, Tb and the time interval between the times Tb, Tc are smaller.

The packet receiving unit PRU (packet output circuit POCR) of the receiving device RD receives the IEEE1394 packets PPa, PPb, PPc, PPd sequentially from the transmitting device TD via the network NW, and stores the IEEE1394 packets PPa, PPb, PPc, PPd sequentially in the buffer memory. When turned to a state capable of implementing packet output processing for the IEEE1394 packet PPa, the packet receiving unit PRU reads the IEEE1394 packet PPa from the buffer memory and compares the value of the cycle timer CTR and the value (value corresponding to time Ta') of the time stamp included in the header H of the IEEE1394 packet PPa. The value of the cycle timer CTR at this time point is smaller than the value of the time stamp, and hence the packet receiving unit PRU waits until the value of the cycle timer CTR matches with the value of the time stamp.

At time Ta', upon matching of the value of the cycle timer CTR with the value of the time stamp, the packet receiving unit PRU outputs the MPEG-2TS packet Pa included in the IEEE1394 packet PPa. Further, along with the output of the MPEG-2TS packet Pa, the packet receiving unit PRU activates the control signal ENB to "1" in an output period of all the 188 bytes of the MPEG-2TS packet Pa, and activates the control signal SYNC to "1" in an output period of the first one byte of the MPEG-2TS packet Pa. Thus, the packet output processing for the IEEE1394 packet PPa is completed. Note that since the time interval between the times Ta, Tb is small, the value of the cycle timer CTR at the time when the packet output processing for the IEEE1394 packet PPa is completed exceeds the value corresponding to the time Tb'.

The packet receiving unit PRU turns to a state capable of implementing packet output processing for the IEEE1394 packet PPb along with the completion of the packet output processing for the IEEE1394 packet PPa. Accordingly, the packet receiving unit PRU reads the IEEE1394 packet PPb from the buffer memory and compares the value of the cycle timer CTR and the value (value corresponding to time Tb') of the time stamp included in the header H of the IEEE1394 packet PPb. The value of the cycle timer CTR at this time point is larger than the value of the time stamp, and hence the packet receiving unit PRU outputs the MPEG-2TS packet Pb included in the IEEE1394 packet PPb immediately. Further, the packet receiving unit PRU activates the control signal ENB to "1" in an output period of all the 188 bytes of the MPEG-2TS packet Pb along with the output of the MPEG-2TS packet Pb, but does not activate the control signal SYNC to "1" in an output period of the first one byte of the MPEG-2TS packet Pb. Thus, the packet output processing for the IEEE1394 packet PPb is completed. Note that since the time interval between the times Ta, Tb and the time interval between the times Tb, Tc are small, the value of the cycle timer CTR at the time when the packet output processing for the IEEE1394 packet PPb is completed exceeds the value corresponding to the time Tc'.

The packet receiving unit PRU turns to a state capable of implementing packet output processing for the IEEE1394 packet PPc along with the completion of the packet output processing for the IEEE1394 packet PPb. Accordingly, the packet receiving unit PRU reads the IEEE1394 packet PPc from the buffer memory and compares the value of the cycle timer CTR and the value (value corresponding to time Tc') of the time stamp included in the header H of the IEEE1394 packet PPc. The value of the cycle timer CTR at this time point is larger than the value of the time stamp, and hence the packet receiving unit PRU outputs the MPEG-2TS packet Pc included in the IEEE1394 packet PPc immediately. Further, the packet receiving unit PRU activates the control signal ENB to "1" in an output period of all the 188 bytes of the MPEG-2TS packet Pc along with the output of the MPEG-2TS packet Pc, but does not activate the control signal SYNC to "1" in an output period of the first one byte of the MPEG-2TS packet Pc. Thus, the packet output processing for the IEEE1394 packet PPc is completed.

The packet receiving unit PRU turns to a state capable of implementing packet output processing for the IEEE1394 packet PPd along with the completion of the packet output processing for the IEEE1394 packet PPc. Accordingly, the packet receiving unit PRU reads the IEEE1394 packet PPd from the buffer memory and compares the value of the cycle timer CTR and the value (value corresponding to time Td') of the time stamp included in the header H of the IEEE1394 packet PPd. The value of the cycle timer CTR at this time point is smaller than the value of the time stamp, and hence the packet receiving unit PRU waits until the value of the cycle timer CTR matches with the value of the time stamp.

At time Td', upon matching of the value of the cycle timer CTR with the value of the time stamp, the packet receiving unit PRU outputs the MPEG-2TS packet Pd included in the IEEE1394 packet PPd. Further, along with the output of the MPEG-2TS packet Pd, the packet receiving unit PRU activates the control signal ENB to "1" in an output period of all the 188 bytes of the MPEG-2TS packet Pd, and activates the control signal SYNC to "1" in an output period of the first one byte of the MPEG-2TS packet Pd. Thus, the packet output processing for the IEEE1394 packet PPd is completed.

As above, in the one embodiment, even when unable to output an MPEG-2TS packet at normal timing, the packet receiving unit PRU (packet output circuit POCR) does not discard the MPEG-2TS packet, and outputs the MPEG-2TS packet while keeping the control signal SYNC inactivated to "0". Further, even when the MPEG-2TS packet includes a PCR, the MPEG decoding unit MDU (clock adjusting circuit CAC) will not adjust the reference clock CKT based on a result of comparing the value of the STC and the value of the PCR when the logic level of the control signal SYNC stored in response to activation of the control signal ENB is "0". Therefore, only the PCR included in an MPEG-2TS packet output at normal timing is used for adjusting of the reference clock CKR. Accordingly, it is possible to avoid discarding of a packet without causing an unnecessary error in the reference clock CKR.

Figure 6:
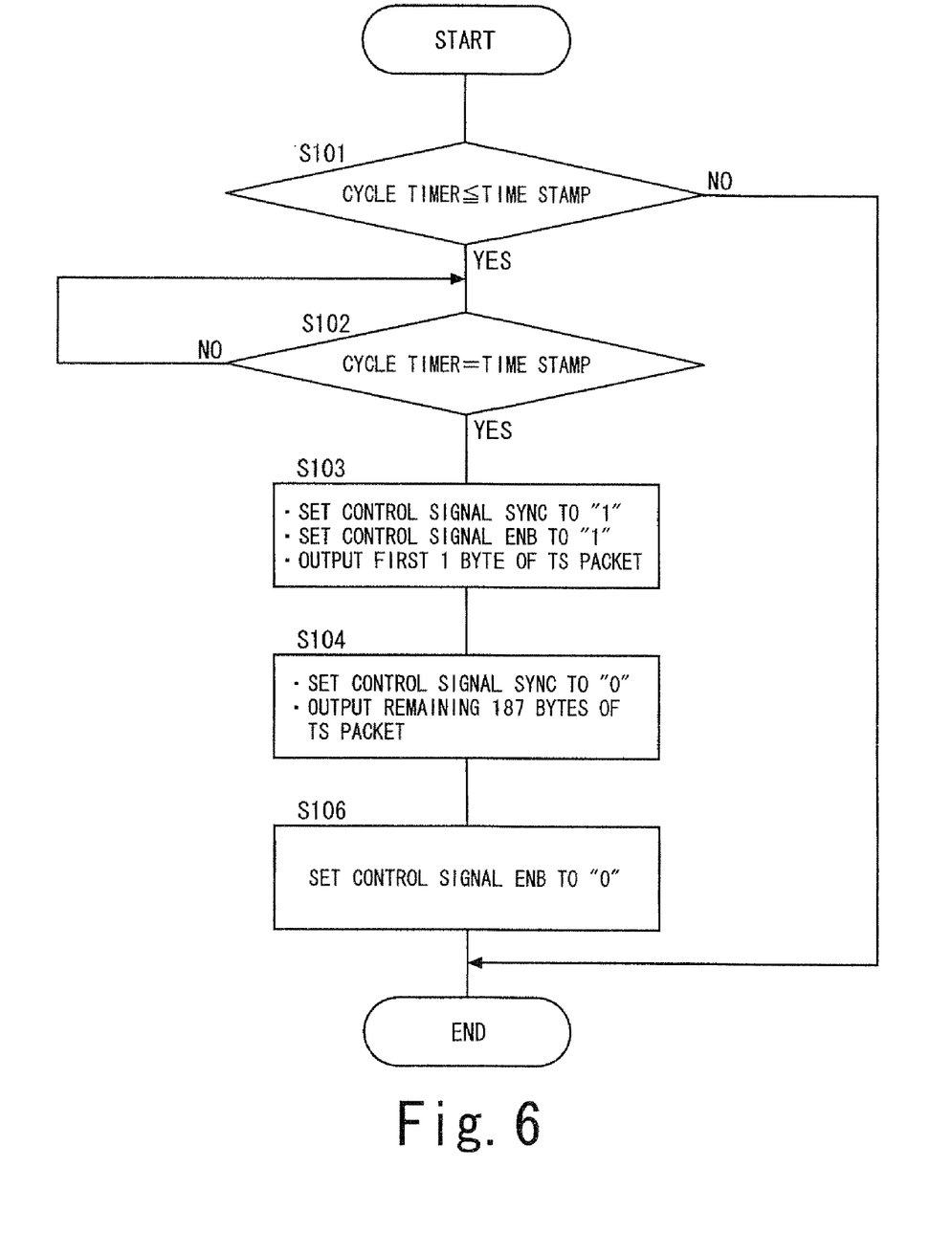
FIG. 6 is a flowchart illustrating packet output processing of a packet receiving unit in a first comparative example.
Figure 7:
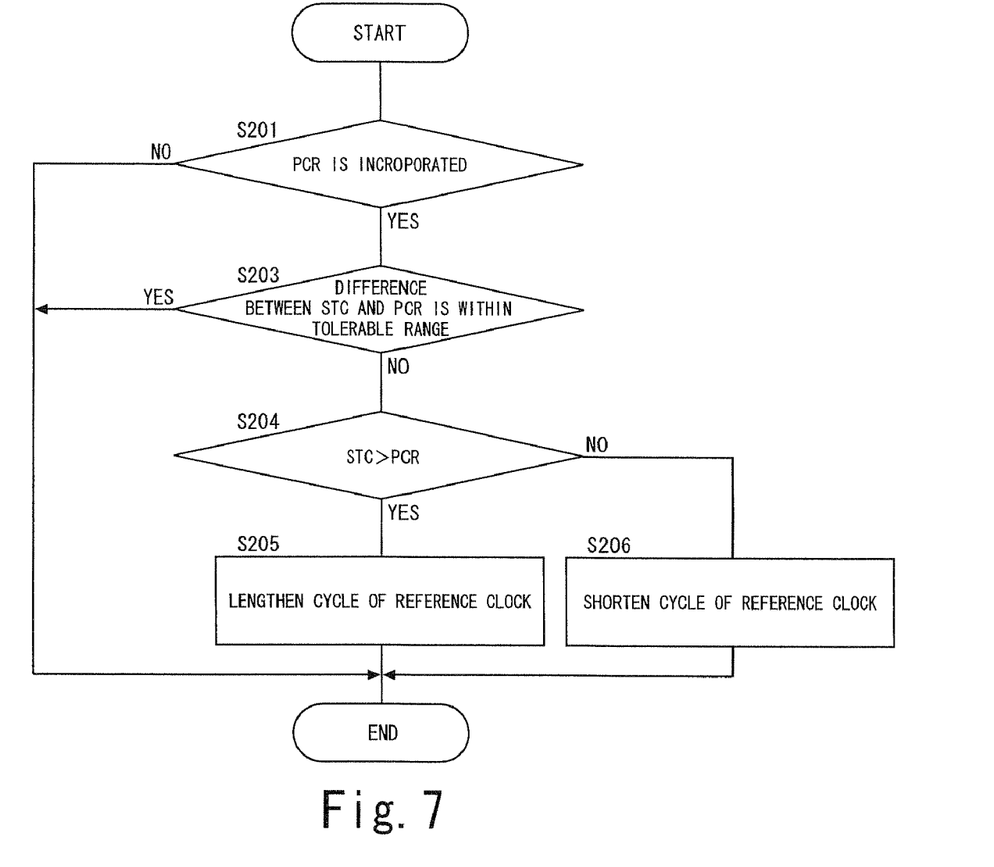
FIG. 7 is a flowchart illustrating clock adjusting processing of an MPEG decoding unit in the first comparative example.
Figure 8:
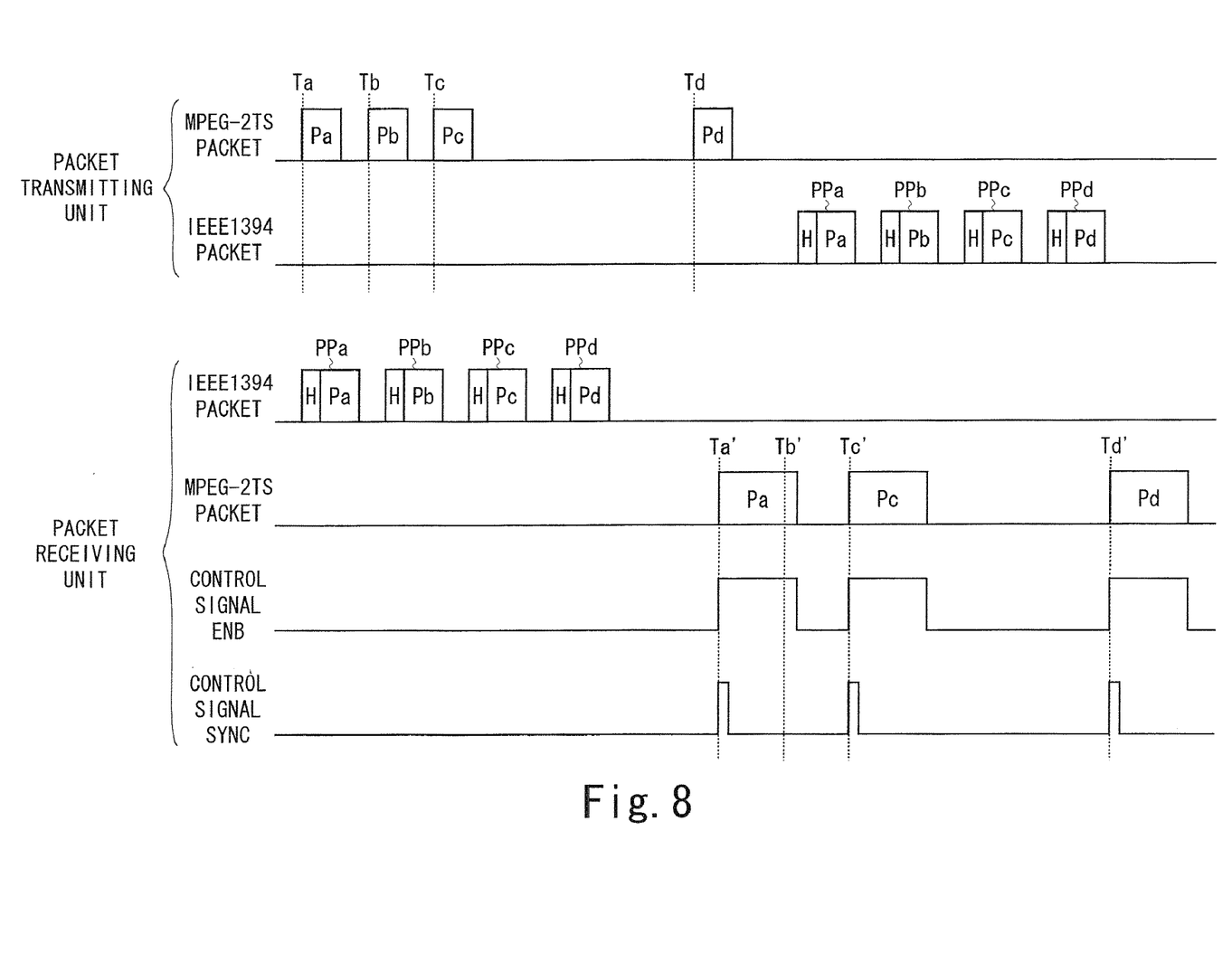
FIG. 8 is an explanatory view illustrating an operation example in the first comparative example.

FIG. 6 to FIG. 8 illustrate a first comparative example. Through explanation of the first comparative example, the same elements as those explained in the one embodiment are given the same reference signs, and detailed explanations thereof are omitted. A receiving device in the first comparative example is identical to the receiving device (FIG. 1) of the one embodiment except that the packet output processing of the packet receiving unit and the clock adjusting processing of the MPEG decoding unit are different.

FIG. 6 illustrates packet output processing of the packet receiving unit in the first comparative example. The packet output processing of the packet receiving unit in the first comparative example is identical to the packet output processing (FIG. 2) of the packet receiving unit in the one embodiment except that the operation S105 is omitted and the packet output processing is completed when the value of the cycle timer CTR is larger than the value of the time stamp in the operation S101. Specifically, when the value of the cycle timer CTR is larger than the value of a time stamp included in the header of an IEEE1394 packet, the packet receiving unit PRU (packet output circuit POCR) in the first comparative example considers the MPEG-2TS packet included in the IEEE1394 packet as a Late packet and discards this packet.

FIG. 7 illustrates clock adjusting processing of the MPEG decoding unit in the first comparative example. The clock adjusting processing of the MPEG decoding unit in the first comparative example is identical to the clock adjusting processing (FIG. 3) of the MPEG decoding unit in the one embodiment except that the operation S203 is omitted. Specifically, when a PCR is incorporated in the MPEG-2TS packet, the MPEG decoding unit MDU (clock adjusting circuit CAC) in the first comparative example adjusts, regardless of the control signal SYNC, the reference clock CKR based on a result of comparing the value of the STC and the value of the PCR.

FIG. 8 illustrates an operation example in the first comparative example. This operation example is identical to another operation example in the one embodiment explained with FIG. 5 except that the packet output processing for the IEEE1394 packet PPb and the packet output processing for the IEEE1394 packet PPc by the packet receiving unit PRU are different.

Upon turning to a state capable of implementing packet output processing for the IEEE1394 packet PPb along with the completion of the packet output processing for the IEEE1394 packet PPa, the packet receiving unit PRU (packet output circuit POCR) of the receiving device RD reads the IEEE1394 packet PPb from the buffer memory and compares the value of the cycle timer CTR and the value (value corresponding to time Tb') of the time stamp included in the header H of the IEEE1394 packet PPb. The value of the cycle timer CTR at this time point is larger than the value of the time stamp, and hence the packet receiving unit PRU considers the MPEG-2TS packet Pb included in the IEEE1394 packet PPb as a Late packet and discards this packet. Thus, the packet output processing for the IEEE1394 packet PPb is completed.

The packet receiving unit PRU turns to a state capable of implementing packet output processing for the IEEE1394 packet PPc along with the completion of the packet output processing for the IEEE1394 packet PPb. Accordingly, the packet receiving unit PRU reads the IEEE1394 packet PPc from the buffer memory and compares the value of the cycle timer CTR and the value (value corresponding to time Tc') of the time stamp included in the header H of the IEEE1394 packet PPc. The value of the cycle timer CTR at this time point is smaller than the value of the time stamp, and hence the packet receiving unit PRU waits until the value of the cycle timer CTR matches with the value of the time stamp.

At time Tc', upon matching of the value of the cycle timer CTR with the value of the time stamp, the packet receiving unit PRU outputs the MPEG-2TS packet Pc included in the IEEE1394 packet PPc. Further, along with the output of the MPEG-2TS packet Pc, the packet receiving unit PRU activates the control signal ENB to "1" in an output period of all the 188 bytes of the MPEG-2TS packet Pc, and activates the control signal SYNC to "1" in an output period of the first one byte of the MPEG-2TS packet Pc. Thus, the packet output processing for the IEEE1394 packet PPc is completed.

As above, in the first comparative example, when unable to output an MPEG-2TS packet at normal timing, the packet receiving unit PRU (packet output circuit POCR) considers the MPEG-2TS packet as a Late packet and discards this packet. Accordingly, when the time interval of input timing of the MPEG-2TS packet in the packet transmitting unit PTU is small, the packet output speed in the packet receiving unit PRU is slow, and hence there is a fear that discarding of packet occurs frequently.

Figure 9:
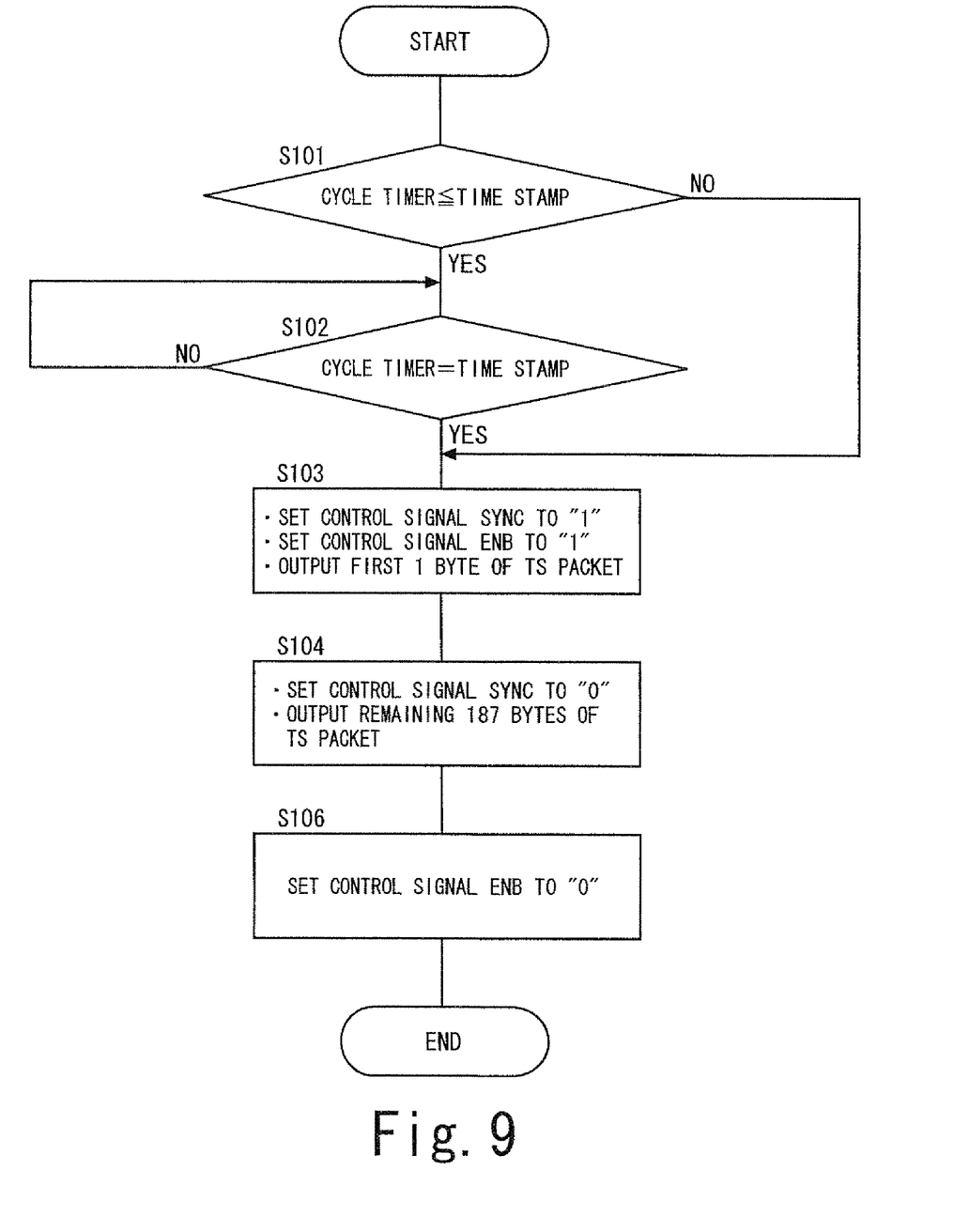
FIG. 9 is a flowchart illustrating packet output processing of a packet receiving unit in a second comparative example.
Figure 10:
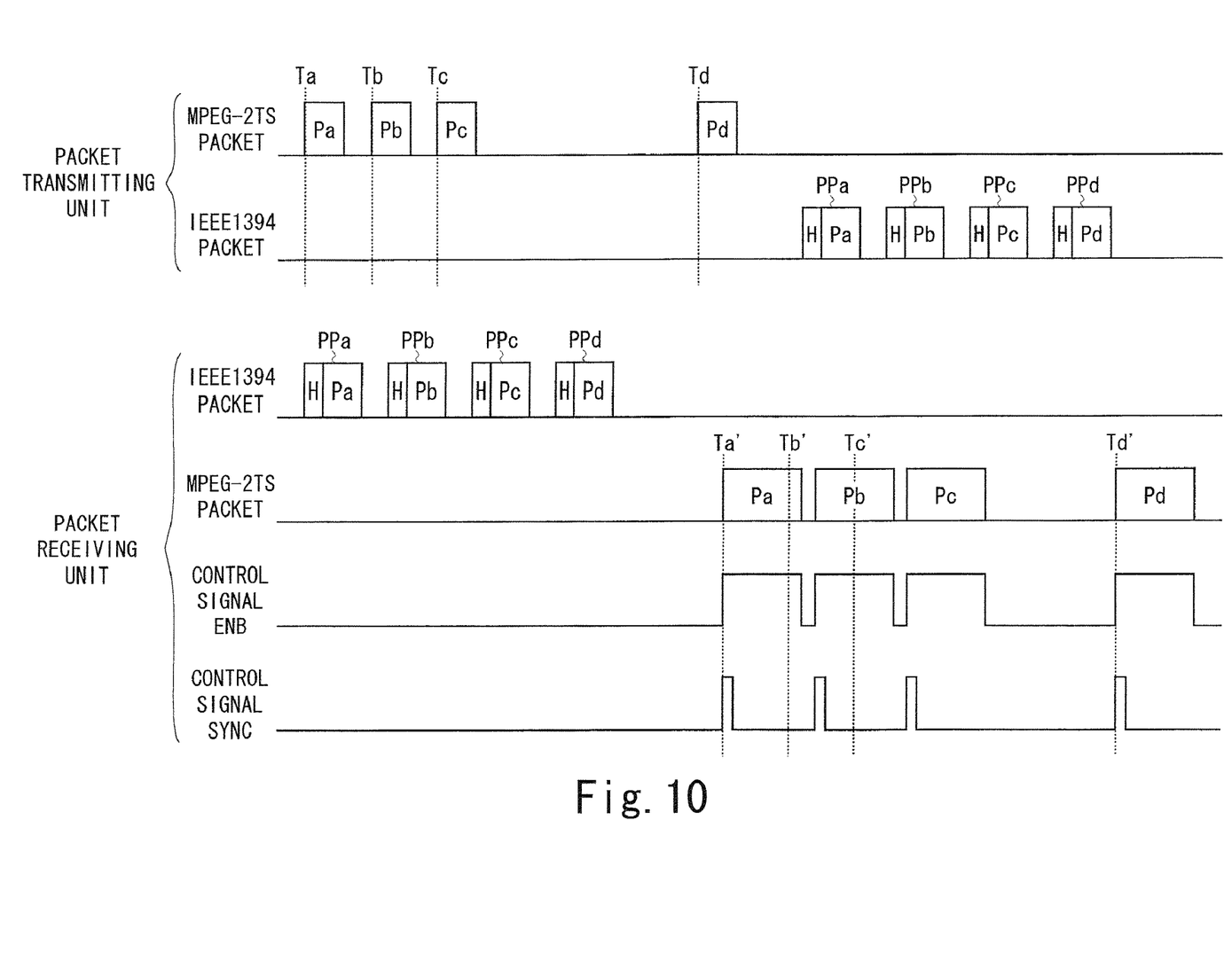
FIG. 10 is an explanatory view illustrating an operation example in the second comparative example.

FIG. 9 and FIG. 10 illustrate a second comparative example. Through explanation of the second comparative example, the same elements as those explained in the one embodiment are given the same reference signs, and detailed explanations thereof are omitted. A receiving device in the second comparative example is identical to the receiving device (FIG. 1) of the one embodiment except that the packet output processing of the packet receiving unit and the clock adjusting processing of the MPEG decoding unit are different.

FIG. 9 illustrates packet output processing of the packet receiving unit in the second comparative example. The packet output processing of the packet receiving unit in the second comparative example is identical to the packet output processing (FIG. 2) of the packet receiving unit in the one embodiment except that the operation S105 is omitted and the packet output processing proceeds to operation S103 when the value of the cycle timer CTR is larger than the value of the time stamp in the operation S101. Specifically, when the value of the cycle timer CTR is larger than the value of a time stamp included in an IEEE1394 packet, the packet receiving unit PRU (packet output circuit POCR) in the second comparative example immediately outputs the MPEG-2TS packet included in the IEEE1394 packet, and activates the control signal ENB to "1" in an output period of all the 188 bytes of the MPEG-2TS packet along with the output of the MPEG-2TS packet and activates the control signal SYNC to "1" in an output period of the first one byte of the MPEG-2TS packet. The clock adjusting processing of the MPEG decoding unit in the second comparative example is identical to the clock adjusting processing (FIG. 7) of the MPEG decoding unit in the first comparative example.

FIG. 10 illustrates an operation example in the second comparative example. This operation example is identical to another operation example in the one embodiment explained with FIG. 5 except that the packet output processing for the IEEE1394 packet PPb and the packet output processing for the IEEE1394 packet PPc by the packet receiving unit PRU are different.

Upon turning to a state capable of implementing packet output processing for the IEEE1394 packet PPb along with the completion of the packet output processing for the IEEE1394 packet PPa, the packet receiving unit PRU (packet output circuit POCR) of the receiving device RD reads the IEEE1394 packet PPb from the buffer memory and compares the value of the cycle timer CTR and the value (value corresponding to time Tb') of the time stamp included in the header H of the IEEE1394 packet PPb. The value of the cycle timer CTR at this time point is larger than the value of the time stamp, and hence the packet receiving unit PRU immediately outputs the MPEG-2TS packet Pb included in the IEEE1394 packet PPb. Further, along with the output of the MPEG-2TS packet Pb, the packet receiving unit PRU activates the control signal ENB to "1" in an output period of all the 188 bytes of the MPEG-2TS packet Pb, and activates the control signal SYNC to "1" in an output period of the first one byte of the MPEG-2TS packet Pb. Thus, the packet output processing for the IEEE1394 packet PPb is completed.

The packet receiving unit PRU turns to a state capable of implementing packet output processing for the IEEE1394 packet PPc along with the completion of the packet output processing for the IEEE1394 packet PPb. Accordingly, the packet receiving unit PRU reads the IEEE1394 packet PPc from the buffer memory and compares the value of the cycle timer CTR and the value (value corresponding to time Tc') of the time stamp included in the header H of the IEEE1394 packet PPc. The value of the cycle timer CTR at this time point is larger than the value of the time stamp, and hence the packet receiving unit PRU immediately outputs the MPEG-2TS packet Pc included in the IEEE1394 packet PPc. Further, along with the output of the MPEG-2TS packet Pc, the packet receiving unit PRU activates the control signal ENB to in an output period of all the 188 bytes of the MPEG-2TS packet Pc, and activates the control signal SYNC to "1" in an output period of the first one byte of the MPEG-2TS packet Pc. Thus, the packet output processing for the IEEE1394 packet PPc is completed.

As described above, in the second comparative example, the packet receiving unit PRU (packet output circuit POCR) outputs an MPEG-2TS packet even when unable to output the MPEG-2TS packet at normal timing. However, the MPEG decoding unit MDU cannot identify normality/abnormality of output timing of the MPEG-2TS packet. Accordingly, the PCR included in the MPEG-2TS packet output at abnormal timing is used to implement adjustment of the reference clock CKR. As a result, an error equal to or larger than a tolerable jitter occurs in the reference clock CKR.

In contrast to the first and second comparative examples, even when unable to output the MPEG-2TS packet at normal timing due to slow packet output speed in the packet receiving unit PRU, the above-described one embodiment can avoid discarding of packet without causing an unnecessary error in the reference clock CKR. Accordingly, the reference clock for data transfer between the packet receiving unit PRU and the MPEG decoding unit MDU is not needed to be a clock of 24.576 MHz, but may be a clock that can satisfy an average bit rate of data transfer between the MPEG encoding unit MEU and the packet transmitting unit PTU. Since a low frequency clock can be used, system designing of the receiving device RD becomes easy, and also there are significant effects in terms of power consumption and/or noise.

Further, in the MPEG decoding unit MDU, only the PCR included in the MPEG-2TS packet output at normal timing is used for adjustment of the reference clock CKR. However, since the PCR is incorporated in the MPEG-2TS packet in units of few tens of ms, adjustment of the reference clock CKR is originally slow control. Therefore, when a part of PCRs is not used for adjustment of the reference clock CKR this would not be a problem in practice, and there is almost no demerit as compared to when discarding of packet occurs (first comparative example), or when the PCR included in the MPEG-2TS packet output at abnormal timing is used for adjustment of the reference clock CKR (second comparative example).

It should be noted that, in the above-described embodiment there is described an example, in which the time stamp included in a packet (IEEE1394 packet) transmitted through the network NW indicates an added value of the value of the cycle timer CTT and the offset value corresponding to a maximum delay time generated by packet transmission via the network NW. In a data transmission system that is small in scale and assures a transmission band, like the data transmission system by IEEE1394 or the like, it is relatively easy to estimate the maximum delay time. However, there are many cases where a transmission band and a delay time occurring on a network are large and it is difficult to estimate the maximum delay time, like in a data transmission system by LAN (Local Area Network), WAN (Wide Area Network), or the like. Accordingly, the time stamp included in a packet transmitted via the network NW may be configured to indicate the added value of the value of the cycle timer CTT and the offset value corresponding to an average delay time generated by packet transmission via the network NW. In this case, when a delay time exceeding the average delay time occurs by packet transmission via the network NW, there may occur a situation such that, at the time when a packet output from the transmitting device TD reaches the receiving device RD, the value of the cycle timer CTR exceeds the value of the time stamp included in the packet. However, when such a situation occurs, the packet receiving unit PRU outputs the MPEG-2TS packet while keeping the control signal SYNC inactivated to "0", and thus discarding of packet can be avoided without causing an unnecessary error in the reference clock CKR even when the average delay time is used instead of the maximum delay time.

Further, in the above-described one embodiment, there is described an example in which the present embodiment is applied to the MPEG-2TS transmission system. For example, the present embodiment may be applied to any other data transmission system in which a mechanism to synchronize the receiving side reference clock with the transmitting side reference clock is realized by a similar configuration.

A proposition of the aforementioned embodiment is to provide a receiving device capable of avoiding discarding of packet without causing an unnecessary error in the receiving side reference clock.

According to one aspect of the embodiment, a receiving unit receives a first packet from a transmitting device via a network and outputs a second packet included in the first packet. A processing unit receives the second packet and implements processing based on a receiving side reference clock on the second packet. A clocking circuit of the receiving unit performs a clocking operation synchronously with a network clock. A packet output circuit of the receiving unit outputs the second packet and outputs a control signal indicating normality/abnormality of output timing of the second packet based on a result of comparing a time of the clocking circuit and a time of first time information included in the first packet. For example, when the time of the clocking circuit is before the time of the first time information, the packet output circuit outputs the second packet and outputs the control signal indicating normality after waiting until both the times match due to a change of the time of the clocking circuit. When the time of the clocking circuit matches with the time of the first time information, the packet output circuit outputs the second packet and outputs the control signal indicating normality. When the time of the clocking circuit is after the time of the first time information, the packet output circuit outputs the second packet and outputs the control signal indicating abnormality. For example, the first time information is incorporated in the first packet by the transmitting device, and indicates a time obtained by adding a maximum delay time or average delay time generated by packet transmission via the network to a time based on the network clock.

A clock adjusting circuit of the processing unit synchronizes, when the second packet includes second time information indicating a time based on a transmitting side reference clock and when the control signal indicates normality, the receiving side reference clock with the transmitting side reference clock based on a result of comparing a time based on the receiving side reference clock and a time of the second time information. For example, when the second packet includes the second time information and the control signal indicates normality, the clock adjusting circuit shortens a cycle of the receiving side reference clock when a difference between a time based on the receiving side reference clock and the time of the second time information is beyond a tolerable range and the time based on the receiving side reference clock is before the time of the second time information. When the second packet includes the second time information and the control signal indicates normality, the clock adjusting circuit lengthens the cycle of the receiving side reference clock when a difference between a time based on the receiving side reference clock and the time of the second time information is beyond a tolerable range and the time based on the receiving side reference clock is after the time of the second time information. For example, the second packet is a transport stream packet complying with an MPEG-2 standard, and the processing unit is an MPEG decoding unit implementing decoding processing according to the MPEG-2 standard.

In the receiving device as above, even when becoming unable to output the second packet at normal timing (timing at which the time of the clocking circuit matches with the time of the first time information) due to slow packet output speed for example, the packet output circuit of the receiving unit does not discard the second packet, and outputs the second packet together with the control signal indicating abnormality. Further, even when the second packet includes the second time information, the clock adjusting circuit of the processing unit will not adjust the receiving side reference clock using the second time information when the control signal indicates abnormality. Therefore, only the second time information included in the second packet output at normal timing is used for adjustment of the receiving side reference clock. Accordingly, discarding of packet can be avoided without causing an unnecessary error in the receiving side reference clock.

When it is easy to estimate a maximum delay time generated by packet transmission via a network, the first time information indicating the time obtained by adding the maximum delay time generated by packet transmission via the network to the time based on the network clock is incorporated in the first packet in the transmitting device. In such cases, a situation can never happen such that the time of the clocking circuit of the receiving unit is in advance of the time of the first time information included in the first packet at the time when the first packet output from the transmitting device reaches the receiving unit of the receiving device. Therefore, it is possible to reliably avoid that the packet output circuit of the receiving unit becomes unable to output the second packet at normal timing due to a delay time generated by packet transmission via the network.

Further, when it is difficult to estimate a maximum delay time generated by packet transmission via a network, the first time information indicating the time obtained by adding the average delay time generated by packet transmission via the network to the time based on the network clock is incorporated in the first packet in the transmitting device. In such cases, a situation can happen such that the time of the clocking circuit of the receiving unit is in advance of the time of the first time information included in the first packet at the time when the first packet output from the transmitting device reaches the receiving unit of the receiving device. However, in the receiving device, when such a situation occurs, the packet output circuit of the receiving unit outputs the second packet together with the control signal indicating abnormality, and therefore, even when the first time information is generated using the average delay time instead of the maximum delay time, it is possible to avoid discarding of packet without causing an unnecessary error in the receiving side reference clock.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A receiving device, comprising:
a receiving unit receiving a first packet from a transmitting device via a network and outputting a second packet included in the first packet; and
a processing unit receiving the second packet and implementing processing based on a receiving side reference clock on the second packet,
wherein the receiving unit comprises a clocking circuit performing a clocking operation synchronously with a network clock, and a packet output circuit outputting the second packet and outputting a control signal indicating normality or abnormality of output timing of the second packet based on a result of comparing a time of the clocking circuit and a time of first time information included in the first packet; and
the processing unit comprises a clock adjusting circuit synchronizing, when the second packet includes second time information indicating a time based on a transmitting side reference clock and when the control signal indicates normality, the receiving side reference clock with the transmitting side reference clock based on a result of comparing a time based on the receiving side reference clock and a time of the second time information,
wherein when the time of the clocking circuit is after the time of the first time information, the packet output circuit outputs the second packet and outputs the control signal indicating abnormality;
when the time of the clocking circuit is before the time of the first time information, the packet output circuit outputs the second packet and outputs the control signal indicating normality after waiting until both the times of the clocking circuit and the time of the first time information match due to a change of the time of the clocking circuit; and
when the time of the clocking circuit matches with the time of the first time information, the packet output circuit outputs the second packet and outputs the control signal indicating normality.

2. The receiving device according to claim 1, wherein when the second packet includes the second time information and the control signal indicates normality:
the clock adjusting circuit shortens a cycle of the receiving side reference clock when a difference between a time based on the receiving side reference clock and the time of the second time information is beyond a tolerable range and the time based on the receiving side reference clock is before the time of the second time information; and
the clock adjusting circuit lengthens the cycle of the receiving side reference clock when a difference between a time based on the receiving side reference clock and the time of the second time information is beyond a tolerable range and the time based on the receiving side reference clock is after the time of the second time information.

3. The receiving device according to claim 1, wherein the first time information is incorporated in the first packet by the transmitting device, and indicates a time obtained by adding a maximum delay time generated by packet transmission via the network to a time based on the network clock.

4. The receiving device according to claim 1, wherein the first time information is incorporated in the first packet by the transmitting device, and indicates a time obtained by adding an average delay time generated by packet transmission via the network to a time based on the network clock.

5. The receiving device according to claim 1, wherein the second packet is a transport stream packet complying with an MPEG-2 standard; and the processing unit is an MPEG decoding unit implementing decoding processing according to the MPEG-2 standard.

* * * * *